United States Patent [19]
Fenkanyn et al.

[11] Patent Number: 6,015,296
[45] Date of Patent: Jan. 18, 2000

[54] APPARATUS FOR GENERATING NONLINEAR DYNAMIC CHAOTIC MOTION

[75] Inventors: John M. Fenkanyn, Akron; Tom T. Hartley, Mogadore, both of Ohio

[73] Assignee: The University of Akron, Akron, Ohio

[21] Appl. No.: 08/794,686

[22] Filed: Feb. 3, 1997

[51] Int. Cl.[7] .................................................. G09B 23/06
[52] U.S. Cl. ........................ 434/301; 434/276; 434/300
[58] Field of Search ........................... 434/276, 300–303; 40/427, 430, 431

[56] References Cited

U.S. PATENT DOCUMENTS

| | | |
|---|---|---|
| 3,623,239 | 11/1971 | Maslokovets . |
| 4,099,340 | 7/1978 | Butler . |
| 4,543,067 | 9/1985 | Wallen . |
| 4,971,562 | 11/1990 | Gleason et al. . |
| 5,772,444 | 6/1998 | DeFee ...................................... 434/301 |

*Primary Examiner*—Glenn E. Richman
*Attorney, Agent, or Firm*—Renner, Kenner, Greive, Bobak, Taylor & Weber

[57] ABSTRACT

An apparatus for generating nonlinear chaotic motion is presented. The apparatus presents a base from which extends a slidable rod that carries a plurality of ring magnets that are deflected by an electromagnet. The base contains an internal power supply that powers a deflection sensor, an internal waveform generator and an electromagnet driver system. The internal waveform generator generates a signal received by the driver system which in turn generates a driver signal received by the electromagnet. As the magnetic field of the electromagnet is varied, the ring magnets are deflected in a linear, nonlinear (e.g. nonlinear resonance phenomenon, etc.) and/or chaotic motion which is observed visually and by the deflection sensor. The apparatus may be provided with external input and output ports that allow connection of an external waveform generator and power supply to the input ports and measuring instruments to the output ports. A processor may be interconnected with the apparatus to allow for open or closed loop configurations thereof. The apparatus allows for physical observation and measurement of chaotic behavior for study and analysis.

15 Claims, 2 Drawing Sheets

APPARATUS FOR GENERATING NONLINEAR DYNAMIC CHAOTIC MOTION

TECHNICAL FIELD

The present invention is directed to an apparatus for generating nonlinear dynamic chaotic motion. More particularly, the present invention is directed to an apparatus which receives either internal or external waveforms to generate electromagnetic fields that are applied to partially restrained magnetic objects. Specifically, the present invention is directed to a device which allows observation and documentation of chaotic behavior exhibited by the magnetic objects.

BACKGROUND ART

The study of physical relationships between a physical stimuli acting upon an object is known to be helpful in better understanding the properties thereof. Stable systems exhibit linear behavior, follow the rules of superposition, and produce periodic output stimuli. For example, the behavior of magnetic objects subjected to magnetic fields is provided by an educational device for investigating and teaching about electromagnetic fields in U.S. Pat. No. 4,971,562. By using this device one can develop a better understanding of magnetic fields, electromagnetic forces and their interaction. It is also known to provide educational science toys as disclosed in U.S. Pat. No. 3,623,239. The device disclosed therein reveals a mechanical model of a cyclotron. Unfortunately, both of these devices provide predictable results based upon the input provided thereto.

Recently, it has been determined that by studying chaotic motion insight can be gained into systems that exhibit apparently random behavior. Systems that are nonlinear do not follow the rules of superposition and produce an output response that is not linearly proportional to its input stimuli. A system that exhibits chaotic behavior is a nonlinear system that is sensitive to initial conditions and whose output response transitions to an "exotic" steady state response that exhibits a quasi-random and aperiodic behavior. One such device that exhibits chaotic behavior is disclosed in U.S. Pat. No. 4,099,340. This device employs a series of rollers with projections that enclose a surface that supports a plurality of different size spheres. As the rollers rotate, their projections strike the spheres and generate observable random collisions. Although modifications may be made to the device to observe their effect, this device does not provide a means for analyzing a quantifiable or measured output.

In order to gain a proper understanding of chaos systems, such as the one above, systems examining random behavior have been revisited in light of recently developed chaos theories. Through measurement and observation, many of these systems exhibiting "random" behavior have been found to be deterministic, bounded and sensitive to initial conditions, which under the study of chaos, are defined as chaotic. To further the understanding of chaos, more measurement and observation of random systems is needed to categorize and develop mathematical models. Although some systems that exhibit chaotic behavior can be visualized by computer simulation of mathematical equations, these systems lack physical reality. Some chaotic systems exist in nature that have physical reality, but lack equivalent computer simulation due to their inherent complexity.

Based upon the foregoing, there is a need in the art for an apparatus which provides actual physical behavior that is measurable, provides reliable re-creation of results and is easy to modify with respect to altering the dynamics of the system.

DISCLOSURE OF INVENTION

In light of the foregoing, it is a first aspect of the present invention to provide an apparatus for generating nonlinear dynamic chaotic motion.

Another aspect of the present invention is to provide an apparatus, as set forth above, which allows for the observation and measurement of chaotic motion.

Still a further aspect of the present invention, as set forth above, is to provide an apparatus which includes a base from which upwardly extends a rod that slidably receives at least one magnet.

Still yet another aspect of the present invention, as set forth above, is to provide an electromagnet at the base, wherein the electromagnet generates a magnetic field that acts upon the magnet received by the rod.

An additional aspect of the present invention, as set forth above, is to provide a sensor to measure movement of the magnet as it is deflected by the electromagnet, and to further provide output connection ports connected to the sensor to allow connection of additional measuring devices thereto.

Still yet another aspect of the present invention, as set forth above, is to provide an adjustable platform between the electromagnet and the magnet so that the change in distance therebetween may be observed.

Still another aspect of the present invention, as set forth above, is to provide the apparatus with a self-contained adjustable internal waveform generator which controls the operation of the electromagnet.

Still a further aspect of the present invention, as set forth above, is to provide the apparatus with input connection ports to allow connection of an external waveform generator to control operation of the electromagnet.

Still yet a further aspect of the present invention, as set forth above, is to provide a processor that may be connected to either one or both of the input and output connection ports to monitor operation of the apparatus.

The foregoing and other aspects of the invention which will become apparent as the detailed description proceeds are achieved by an apparatus for generating nonlinear chaotic motion, comprising a rod; an electromagnet positioned in proximity to said rod; at least one magnet slidable upon said rod; and means for controlling the operation of said electromagnet, wherein said controlling means receives input that causes said electromagnet to move said at least one magnet in nonlinear chaotic motion upon said rod.

Another aspect of the invention which shall become apparent herein is obtained by a system for generating nonlinear chaotic motion, comprising: means for generating a waveform; an electromagnetic driver system for receiving said waveform and generating a driver signal; an electromagnet for receiving said driver signal and generating a nonlinear chaotic magnetic field; and at least one magnet influenced by said nonlinear chaotic magnetic field.

BRIEF DESCRIPTION OF THE DRAWINGS

For a complete understanding of the objects, techniques and structure of the invention, reference should be made to the following detailed description and the accompanying drawings wherein.

BEST MODE FOR CARRYING OUT THE INVENTION

Figure 1:
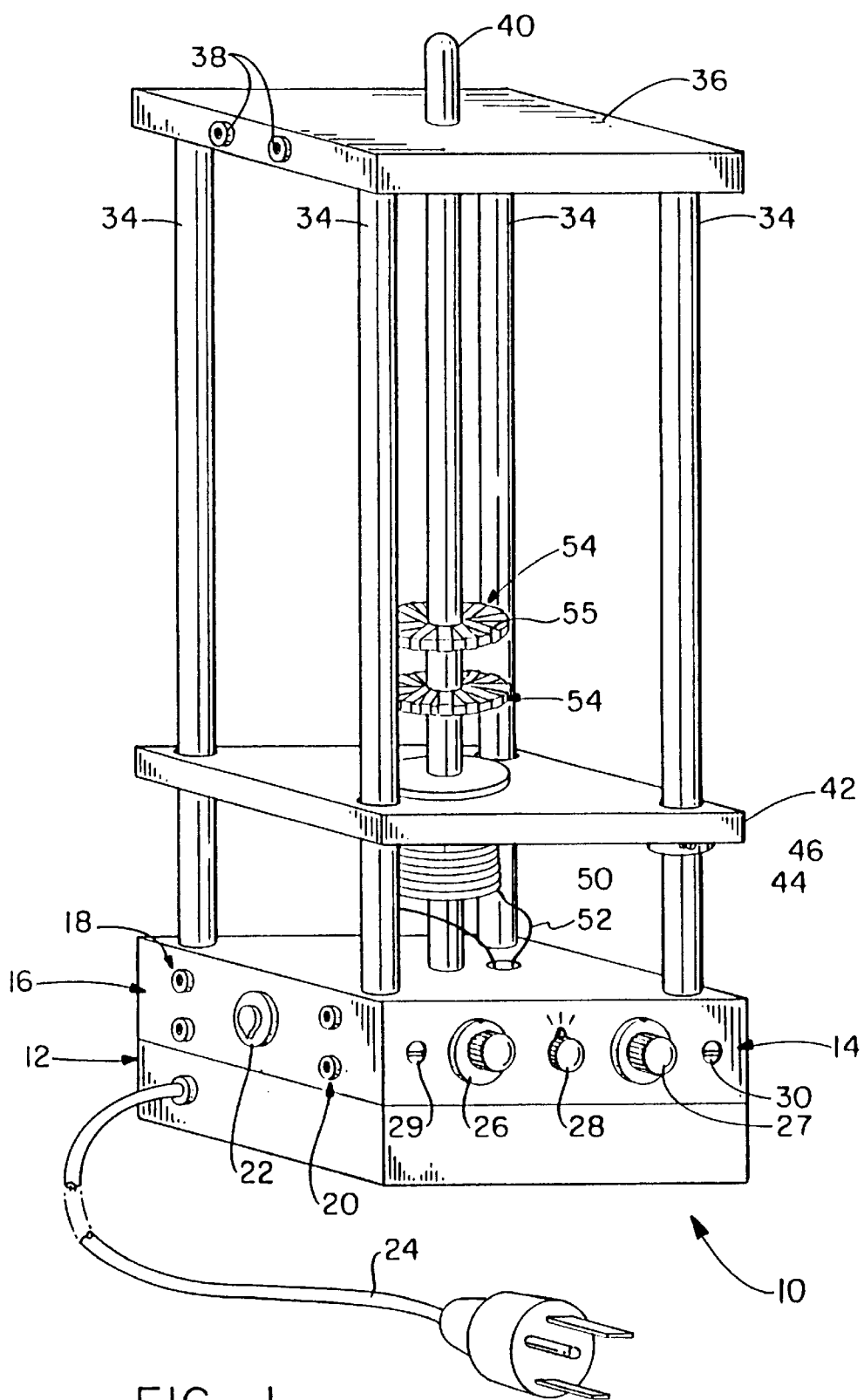
FIG. 1 is a perspective schematic view of the present invention.

Referring now to the drawings and more particularly to FIG. 1, it can be seen that an apparatus for generating nonlinear dynamic chaotic motion is designated generally by the numeral 10. The apparatus 10 includes a base 12 which contains a control system, input and output ports, control adjustments and the like for operating the apparatus. In particular, the base 12 provides an internal control panel 14 and an external control panel 16. The base 12 may be provided with rubber pads at the bottom thereof to minimize vibration of the apparatus 10. The apparatus 10 may be used for viewing unpredictable chaotic behavior or as a novelty item or toy. The apparatus 10 may be a self-contained operating unit operated via the internal control panel 14 so that the user may make any number of adjustments thereto to change the visual output of the device. Alternatively, the apparatus 10 may be controlled through the external control panel 16 and used as a teaching device, wherein various external inputs are provided and measured by externally provided measuring devices. By studying the nonlinear, chaotic or random behavior of the apparatus, new theories can be developed in an attempt to predict or classify chaotic behavior.

The external control panel 16 includes a pair of external power supply ports 18 to provide positive (+) and negative (−) terminals for connection of an external power supply to the apparatus 10. The external control panel 16 further includes external waveform generator ports 20 which provide positive (+) and negative (−) terminals for connection of an external waveform generator to the apparatus 10. A switch 22 is provided on the internal control panel 16 to allow for selection of either self-contained internal inputs or external inputs. An AC power cord 24 may be connected through the external control panel 16. It is within the scope of the present invention that the apparatus 10 may be powered by batteries or some other power source contained within the base 12.

The internal control panel 14 includes a plurality of adjustments or inputs that may be used to control the operation of an internal waveform generator contained within the base 12. These adjustments include a frequency control 26, an amplitude control 27, a shape selector switch 28, a symmetry potentiometer 29 and a duty cycle potentiometer 30. As is evident from the names of the various inputs, the internal waveform generator can be provided with about any type of input control signal. It will be appreciated that the shape selector switch 28 can provide signal shapes such as a sine, square, triangle wave or the like.

Extending upwardly from the base 12 are a plurality of support columns 34 which carry a deflection sensor 36. A pair of output connection ports 38 are provided by the deflection sensor 36 to allow for connection of other observation and measuring devices thereto. In the preferred embodiment, the deflection sensor 36 is an optical sensor that provides an analog voltage or current signal proportional to the monitored behavior of the apparatus 10. Of course other types of sensors may be used depending upon the type of output that is monitored.

A slide rod 40, preferably made of a low coefficient of friction synthetic resin material sold under the trademark Teflon®, also extends upwardly from the base 12 and extends through the deflection sensor 36. As seen in FIG. 1, the slide rod 40 is centrally disposed on the base 12 with the support columns 34 arranged around the periphery of the base. It will be appreciated that any angular disposition of the support columns 34 and the slide rod 40 may be used in the present invention. In fact, any angular projection of the slide rod 40 adds another input variable to the operation of the apparatus 10.

An adjustable platform 42 is carried by the support columns 34 and is moveable upon the slide rod 42. A collar 44, which has an adjustable set screw 46, is disposed on at least one of the support columns 34 for the purpose of supporting and holding the adjustable platform 42 anywhere along the length thereof. Of course, any means for carrying the adjustable platform 42 may be used.

An electromagnet 50, which has wire leads 52 extending therefrom, is carried on the slide rod 40, between the base 12 and the adjustable platform 42. Also carried by the slide rod 40, but disposed between the adjustable platform 42 and the deflection sensor 36, is at least one ring magnet 54. The inner periphery of the ring magnet 54 may be coated with a low coefficient of friction synthetic resin material, such as Teflon® or wrapped with a like tape 55 to reduce the amount of friction between the ring magnet and the slide rod 40. The tape 55 also provides a better reflective surface to reduce noise associated with optically sensing the position of the ring magnets 54. The electromagnet 50 may be obtained commercially or may be a wire wound bobbin disposed around a ferrite rod. The ring magnets 54 may be disposed with their north and south poles facing one another, opposite one another or in any combination thereof. The slide rod 42 is moveable to allow for insertion and removal of the ring magnets 54.

Figure 2:
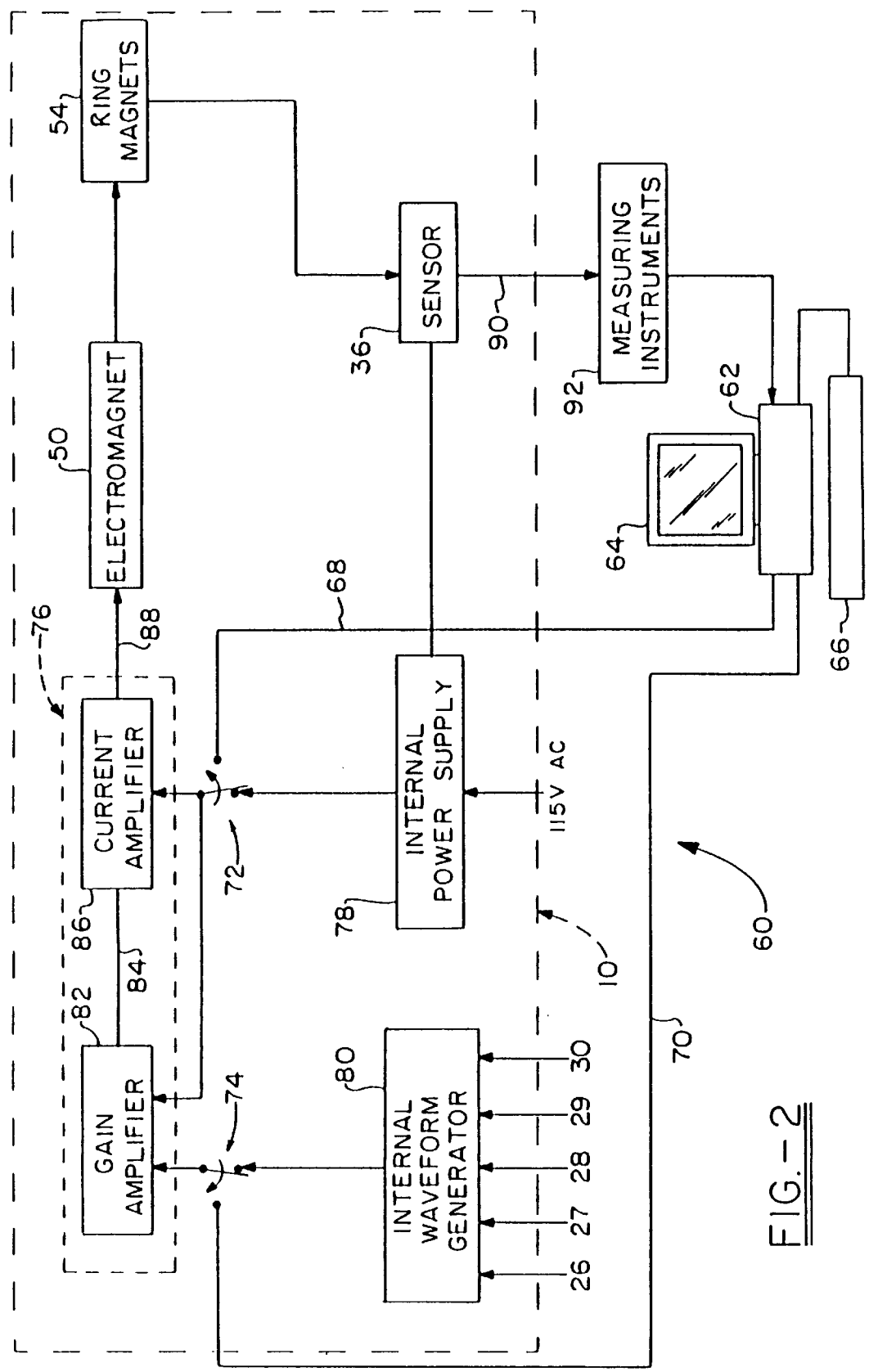
FIG. 2 is a schematic control block diagram of the present invention.

Referring now to FIG. 2, it can be seen that a control system for the apparatus 10 is designated generally by the numeral 60. The control system 60 includes a processor 62 which contains the necessary hardware, software and memory to control and monitor the operation of the apparatus 10. Connected to the processor 62 may be a monitor 64 and a keyboard 66. The monitor 64 provides a visual interface between an operator and the apparatus 10 while the keyboard allows the operator to provide input to the apparatus 10 and connected components. The processor 62 controls an external power supply line 68 and an external waveform line 70. The switch 22 is used to control a power switch 72 and a waveform switch 74. The switches 72 and 74 are employed to control operation of an electromagnetic driver system 76 by selecting either an internal or external mode of operation. Normally, the switch 72 is toggled to connect an internal power supply 78 to the electromagnetic drive system 76, the deflection sensor 36 and an internal waveform generator 80. The internal power supply 78, which is connected to the AC power supply cord 24, generates DC voltages to power the aforementioned components. The switch 74 is normally toggled to connect the internal waveform generator 80 to the electromagnetic drive system 76. If desired, the switch 72 may be toggled to connect the external power supply line 68 to the electromagnetic drive system 76. In a similar manner, the switch 74 may be toggled to connect the external waveform line 70 to the electromagnetic drive system 76. All of the electrical components of this system are selected to minimize electrical noise.

The electromagnet drive system 76 includes a gain amplifier 82 which generates a gain signal 84 received by a current amplifier 86 which in turn generates a driver signal 88. As those skilled in the art will appreciate, as either the external or internal waveform generators vary their respective signals to the electromagnetic drive system 76, the driver signal 88 is a sinusoidal signal that acts upon the electromagnet 50, which in turn generates a magnetic field that acts upon the ring magnets 54. The magnetic field interacts with the magnetic field from the ring magnets 54 producing a deflection that can be linear, nonlinear and/or chaotic. The deflection sensor 36 monitors the movement of the uppermost ring magnet 54 and generates an output signal 90 that is in the form of an analog voltage or current signal that is proportional to the magnet's vertical deflection. The output signal may be received by a measuring instrument 92 or directly by the processor 62. The measuring instrument 92 may be an analog/digital oscilloscope, a spectrum analyzer or any other diagnostic instrument.

As will be appreciated from the above description, the apparatus 10 visually demonstrates nonlinear and chaotic behavior as evidenced by the vertical deflection of the ring magnets 54. The internal waveform generator 80 may be employed to manually vary the deflection of the ring magnets 54 by adjusting any one of the inputs 26–30. The apparatus 10 also allows connection of an external waveform generator and an external power supply which can be controlled through software running on the processor 62 for manipulation of the ring magnets 54 by mathematical equations or other modelling programs. Another interface is provided with the processor 62 when the output signal 90 is connected directly thereto or through the measuring instruments 92. As such, the dynamics of the system 60 may be altered by varying the number of ring magnets 54, altering the orientation of the slide rod 40, varying the value of power supplied to the driver system 78 or by varying the waveform through either the internal waveform generator 80 or by the external waveform line 70. The apparatus 10 allows for signal comparisons between generated the input forcing function and the measured output signal. The external input and output connections allow for either the configuration of closed loop or open loop control systems.

The apparatus 10 and related control system 60 provide many advantages. By studying the deflection of the ring magnets 54, the apparatus 10 may be used to study chaotic behavior even though the forcing function of the waveform generators is periodic. Virtually infinite configurations of the apparatus 10 may be provided for the study on nonlinear/chaotic behavior. Various configurations may be obtained by changing the number and polarity position of the ring magnets, the type of input signal, frequency, amplitude and the like. The apparatus may be used as a demonstration and experimentation device in science courses dealing with nonlinear dynamics and chaos. The apparatus provides variable control of the waveform shape, amplitude, frequency, duty cycle and symmetry through either the internal waveform generator 80 and the internal power supply 78 or through the processor 62. The apparatus may be used for study of control systems including, but not limited to classical, adaptive and identification to name a few. The apparatus may also be configured and presented as a conversation piece or an amusing toy.

Thus it can be seen that the objects of the invention have been satisfied by the structure presented above. It should be apparent to those skilled in the art that the objects of the present invention could be practiced with various types of magnets in any plane of motion.

While the preferred embodiment of the invention has been presented and described in detail, it will be understood that the invention is not limited thereto or thereby. Accordingly, for an appreciation of the true scope and breadth of the invention, reference should be made to the following claims.

What is claimed is:

1. An apparatus for generating nonlinear motion, comprising:
   a rod;
   an electromagnet positioned in proximity to said rod;
   at least one magnet slidable upon said rod; and
   means for controlling the operation of said electromagnet, wherein said controlling means receives periodic input that causes said electromagnet to deflect said at least one magnet in nonlinear motion upon said rod.

2. The apparatus according to claim 1, further comprising:
   a sensor in proximity to said rod to measure the movement of said at least one ring magnet.

3. The apparatus according to claim 1, further comprising:
   a platform interposed between said electromagnet and said one ring magnet, wherein said platform is adjustable to vary the deflection of said at least one ring magnet.

4. The apparatus according to claim 1, wherein said controlling means comprises:
   a waveform generator for generating waveforms;
   a power supply for generating power; and
   an electromagnetic drive system for receiving said waveforms and said power and generating a drive signal received by said electromagnet to vary the deflection of said at least one magnet.

5. The apparatus according to claim 4, further comprising:
   a first switch to select between an internal waveform generator and an external waveform generator, wherein one of said internal and external waveform generators generates said waveforms; and
   a second switch to select between an internal power supply and an external power supply, wherein one of said internal and external power supplies generates said power.

6. The apparatus according to claim 5, further comprising:
   a sensor received by said rod to measure the deflection of said at least one ring magnet; and
   a processor providing said external waveform generator and said external power supply, said processor receiving output from said sensor.

7. The apparatus according to claim 6, wherein said electromagnetic drive system comprises:
   a gain amplifier for receiving said waveforms and generating a gain signal; and
   a current amplifier for receiving said gain signal and generating said driver signal.

8. A system for generating nonlinear motion, comprising:
   means for generating a waveform;
   an electromagnetic driver system for receiving said waveform and generating a driver signal;
   an electromagnet for receiving said driver signal and generating a magnetic field; and
   at least one magnet influenced by said magnetic field.

9. The system according to claim 8, further comprising:
   a sensor for detecting the movement of said at least one magnet as said magnetic field is applied.

10. The system according to claim 9, further comprising:
    a processor for monitoring said generating means and said sensor to provide an analysis of the movement of said at least one magnet.

11. The system according to claim 10, wherein said electromagnet driver system comprises:
    a gain amplifier for receiving said waveform and generating a gain signal; and
    a current amplifier for receiving said gain signal and generating said driver signal.

12. The system according to claim 11, further comprising:
    a plurality of waveform adjustment controls for modifying said waveform including a waveshape selector, a duty cycle adjustment, a frequency adjustment, an amplitude adjustment and a symmetry adjustment.

13. The system according to claim 12, wherein said sensor output is detected by at least one of a spectrum analyzer and an oscilloscope, wherein the output of said spectrum analyzer and said oscilloscope is connected to said processor.

14. The system according to claim 13, wherein said generating means in provided by said processor.

15. The system according to claim 14, wherein said at least one magnet is restrained to one plane of motion.

* * * * *